(12) United States Patent
Kleshchevich et al.

(10) Patent No.: US 9,430,451 B1
(45) Date of Patent: Aug. 30, 2016

(54) PARSING AUTHOR NAME GROUPS IN NON-STANDARDIZED FORMAT

(71) Applicant: Inera, Inc., Belmont, MA (US)

(72) Inventors: Igor Kleshchevich, Boston, MA (US); Bruce D. Rosenblum, Belmont, MA (US); Irina Golfman, Belmont, MA (US)

(73) Assignee: Inera, Inc., Belmont, MA (US)

( * ) Notice: Subject to any disclaimer, the term of this patent is extended or adjusted under 35 U.S.C. 154(b) by 0 days.

(21) Appl. No.: 14/676,664

(22) Filed: Apr. 1, 2015

(51) Int. Cl.
*G06F 17/20* (2006.01)
*G06F 17/21* (2006.01)
(Continued)

(52) U.S. Cl.
CPC ......... *G06F 17/218* (2013.01); *G06F 17/2276* (2013.01); *G06F 17/2294* (2013.01); *G06F 17/2705* (2013.01)

(58) Field of Classification Search
CPC .................. G06F 21/6227; G06F 2221/2107; G06F 17/211; G06F 17/24; G06F 17/28; G06F 17/30011; G06F 17/2247; G06Q 50/182; G09C 5/00; H04L 63/0428
USPC ........... 704/1; 707/722, 737; 1/1; 705/14.72; 715/234, 256
See application file for complete search history.

(56) References Cited

U.S. PATENT DOCUMENTS

| 7,028,259 | B1 | 4/2006 | Jacobson |
| 7,251,777 | B1 | 7/2007 | Valtchev et al. |
| 7,689,557 | B2 | 3/2010 | Pandit et al. |

(Continued)

FOREIGN PATENT DOCUMENTS

| CN | 103412852 | 11/2013 |
| JP | H0290360 | 3/1990 |

(Continued)

OTHER PUBLICATIONS

Name Object Reference Guide, by Melissa Data Corporation, 2013, pp. 1-50; http://www.melissadata.com/nameobject/nameobject.htm.

(Continued)

*Primary Examiner* — Charlotte M Baker
(74) *Attorney, Agent, or Firm* — Hamilton, Brook, Smith & Reynolds, P.C.

(57) ABSTRACT

The present invention is directed to a method and corresponding system for parsing author name text strings in documents. The method and system may electronically scan a document that contains an author name text string comprising a set of initials, one or more author surnames, and punctuation. The author name text string may be in non-standardized format. The method and system may identify a character sequence in the document as potentially being the author name test string based on (i) a sequence of title-case words, capital letter, and punctuation, and (ii) the character sequence ending with a recognized indicator. The method and system may parse the identified character sequence by converting any punctuation and whitespace between terms in the character sequence to a single space character, identifying a pattern of surname and set of initials comprising each author name contained in the character sequence, and marking up the components of surname and set of initials comprising each author name. The method and system may use the marked up character sequence to identify and correct errors in punctuation and capitalization in the character sequence, and output an updated character sequence in standardized format.

22 Claims, 6 Drawing Sheets

(51) Int. Cl.
*G06F 17/22* (2006.01)
*G06F 17/27* (2006.01)

(56) References Cited

U.S. PATENT DOCUMENTS

| | | | |
|---|---|---|---|
| 7,953,724 B2 | 5/2011 | Griffith | |
| 8,082,241 B1 | 12/2011 | Pop-Lazarov et al. | |
| 8,201,085 B2 | 6/2012 | Rollins et al. | |
| 8,612,411 B1 | 12/2013 | Mittal | |
| 8,676,780 B2 | 3/2014 | Rollins et al. | |
| 8,713,031 B1 | 4/2014 | Lee | |
| 9,141,823 B2* | 9/2015 | Dawson | G06F 21/6227 |
| 2003/0009489 A1 | 1/2003 | Griffin | |
| 2007/0239433 A1 | 10/2007 | Chaski | |
| 2008/0059435 A1 | 3/2008 | Steensgard | |
| 2008/0071803 A1 | 3/2008 | Boucher | |
| 2008/0178077 A1 | 7/2008 | Boucher | |
| 2008/0282187 A1 | 11/2008 | Buschman et al. | |
| 2008/0320579 A1 | 12/2008 | Rollins et al. | |
| 2009/0157585 A1 | 6/2009 | Fu et al. | |
| 2009/0292673 A1 | 11/2009 | Carroll | |
| 2010/0287188 A1 | 11/2010 | Kakar | |
| 2011/0029528 A1 | 2/2011 | Lee et al. | |
| 2011/0035210 A1 | 2/2011 | Rosenfeld et al. | |
| 2011/0087682 A1 | 4/2011 | Serjeantson et al. | |
| 2011/0107194 A1 | 5/2011 | Cui | |
| 2011/0225482 A1 | 9/2011 | Chan et al. | |
| 2011/0282890 A1 | 11/2011 | Griffith | |
| 2012/0036157 A1 | 2/2012 | Rolle | |
| 2012/0047127 A1 | 2/2012 | McBeath et al. | |
| 2012/0072422 A1 | 3/2012 | Rollins et al. | |
| 2012/0166924 A1 | 6/2012 | Larson et al. | |
| 2013/0080266 A1* | 3/2013 | Molyneux | G06Q 10/00 705/14.72 |
| 2014/0006424 A1 | 1/2014 | Al-Kofahi et al. | |
| 2014/0317113 A1* | 10/2014 | Cox | G06F 17/30598 707/737 |
| 2015/0095315 A1* | 4/2015 | Decrescenzo | G06F 3/04815 707/722 |
| 2016/0117286 A1* | 4/2016 | Dettman | G06F 17/2247 715/256 |

FOREIGN PATENT DOCUMENTS

| | | |
|---|---|---|
| JP | 2002297632 | 10/2002 |
| KR | 20100037325 | 4/2010 |
| KR | 20130090192 | 8/2013 |

OTHER PUBLICATIONS

"Parsing Citations in Biomedical Articles using Conditional Random Fields", Qing Zhang, Yong-Gang Cao, Hong Yu, University of Wisconsin-Milwaukee (2011), pp. 190-194.

"ParsCit: An Open-Source CRF Reference String Parsing Package", Isaac G. Councill, C. Lee Giles, and Min Yen Kan, The Pennsylvania State University (2008).

"Locating and Parsing Bibliographic References in HTML Medical Articles", Jie Zou, Daniel Le, and George R. Thoma, Lister Hill National Center for Biomedical Communications, National Library of Medicine (2010).

"A Structural SVM Approach for Reference Parsing", Xiaoli Zhang, Jie Zou, Daniel X. Le, and George R. Thoma, Lister Hill National Center for Biomedical Communications, National Library of Medicine (2011).

"Bibliographic Attribute Extraction from Erroneous References Based on a Statistical Model", Takasu, A. Institute of Informatics, Tokyo Japan (2003) (Abstract Only).

"Improved Bibliographic Reference Parsing Based on Repeated Patterns", Guido Sautter and Kelements Bohm, Karlsruhe Institute of Technology, Karlsruhe, Germany (2012).

"Automated Resolution of Noisy Bibliographic References", Markus Demleitner et al., NASA Astrophysics Data System, Harvard-Smithsonian Center for Astrophysics (2004).

"Taxamatch, an Algorithm for Near ('Fuzzy') Matching of Scientific Names in Taxonomic Databases", Tony Rees, Sep. 23, 2014.

"Efficient String Matching: An Aid to Bibliographic Search", Alfred V. Aho and Margaret Corasick, Bell Laboratories, Association for Computing Machinery (1975).

http://www.ictect.com/Home; "Publishing Outsourcing: e-Book and XML Services" the intelligent content company, ictect, Jul. 2014. Retrieved from internet Jun. 8, 2015.

\* cited by examiner

PARSING AUTHOR NAME GROUPS IN NON-STANDARDIZED FORMAT

BACKGROUND OF THE INVENTION

The global expansion of the Internet, along with advances in digital technology, has caused dramatic changes in the field of scholarly literature. These advances have provided for the rapid dissemination of information, combined with increased global participation in scholarly research, resulting in demand for increased speed in publishing scholarly literature. These advances have also resulted in the demand to transition from publishing scholarly literature in print format to electronic format, and attempting to meet the new expectations associated with providing publications in electronic format accessible through the Internet.

Due to these dramatic changes, publishing professionals, such as authors, editors, and proofreaders, are under great time pressures, while also managing the quality of the publications. One area of publishing where these issues are prevalent is the formatting of bibliographic references in scholarly literature. The transition to electronic format has increased the expectation to provide accurately formatted bibliographic references, as it is now possible to electronically link related online content using the bibliographic references. However, formatting bibliographic references by hand is a laborious process and checking that the components of the formatted references are accurate takes even longer. Prior art publication systems provide methods for automatically formatting bibliographic references, but these systems cannot correctly identify and parse certain components of a bibliographic reference, such as author name groups, especially when errors exist in the presentation. As such, the prior art systems may output bibliographic references with their respective components in a non-standardized format, therefore, still requiring the laborious manual checking of the formatted references for accuracy. Thus, in the publication of scholarly literature, there is a need for a method that correctly identifies and parses components of a bibliographic reference, such as author name groups, and outputs a bibliographic reference in standardized format. This same need also exists in other areas of literature where other author related text strings, similar to author name groups, also need to be identified and parsed into standardized formats.

SUMMARY OF THE DISCLOSURE

The present invention is directed to a computer-based method and corresponding system for parsing author name text strings in documents. The present invention may include, or use, a scanner, or other such scanning module configured on a digital processor to scan a document according to the method and system of the present invention. The method and system may electronically scan a document that contains an author name text string. In some embodiments, the document may contain more than one author name text string. Each author name text string may be comprised of a set of initials, one or more author surnames, and punctuation. In example embodiments, the author name text string may be an author name group having one or more author names, such that each author name comprises a respective set of initials, surname, and punctuation. In some embodiments, the author name text string comprises at least one author name in non-standardized format, such as the author name is ill-punctuated or ill-capitalized. In some embodiments, the author name text string may be in non-standardized format due to missing punctuation between the author name text string and other text strings in the document. In example embodiments, the author name text string may be a bibliographic reference, and the document may be a piece of scholarly literature.

During the electronic scanning of the document, the method and system may identify a character sequence in the document as potentially being the author name text string. The method and system may identify the character sequence as the author name text string based on the sequence of title-case words, capital letters, and punctuation in the character sequence. The method and system may also identify the character sequence as the author name text string based on the character sequence ending with a recognized indicator, such as the term "et al.", a digit indication of a year, or a title-case word followed by at least three lower case terms indicating the title of the referenced work. The identified character sequence may follow one or more patterns of: (1) an author surname followed by one or more author initials, (2) one or more author initials followed by an author surname, (3) sequence of capital letters possibly separated by punctuation, and (4) punctuation and the term "and" (or such variation as "&").

If a character sequence is identified in the document as potentially being the author name text string, the method and system may parse the identified character sequence to determine whether it is actually the author name text string. The present invention may include, or use, a parser, or other such parsing module configured on a digital processor, to parse the identified character sequence according to the method and system of the present invention. In some embodiments, the parsing of the identified character sequence may include first saving a copy of the identified character sequence. The method and system may save the identified character sequence by splitting the character sequence into pieces based on the placement of alphanumeric characters, and then combining the pieces into a structure in memory (e.g., data structure), such as an array.

After saving a copy of the identified character sequence, the method or system may then update the identified character sequence in the document. In some embodiments, the method and system may first update the identified character sequence by converting any punctuation or white space between terms in the character sequence to a single space character, such as a single space (ASCII ×20) character. This update, by converting all punctuation or white space to a single space, results in a so called single space format of the character sequence. The method and system may then determine whether one or more author names are actually contained in the converted character sequence by identifying a pattern of surname and set of initials in the character sequence representing the one or more author names. If the method and system cannot identify specific patterns of surname and initials comprising the entire character sequence, then the method and system may end the parsing process of the character sequence. If these patterns are identified, the method and system may further identify the individual components in the pattern, and markup these components as specifically indicating the component as surname and initials. In some embodiments, the method and system may use a markup language, such as the XML reference markup language, for marking up the components, and the markup of the components may result in markup elements, such as XML reference markup tags, surrounding each component. Other markup languages are also suitable.

Once the components of surname and initials have been marked up for each author name in the author name text string, in some embodiments, the method and system may make modifications to the marked up character sequence, such as correcting errors in capitalization based on the marked up component identification as a surname or initials. The method and system may next save the marked up character sequence by splitting the character sequence into pieces based on the placement of alphanumeric characters and markup elements, and combining the pieces into a structure in memory, such as an array. The method and system may then combine the previously saved identified character sequence array with this marked up character sequence array, wherein resulting in a combined array. In some embodiments, the combined array will contain the markup elements and other modifications made to the marked up character sequence together with the punctuation from the originally identified character sequence. The combined array may then be output in a markup format, or any other format marking the surname and initials components, as a single text string.

The method and system may then process the text string in the markup format to update punctuation placement in the text string, including correcting ill-punctuation. In some embodiments, the method and system may move any end punctuation for a marked up component outside the markup elements. The punctuation moved outside the markup elements may be verified for correct placement of punctuation separating the specific components, such as use of commas between each author name, and may be updated accordingly. The punctuation still inside the markup elements may be verified as the correct placement within a component, such as periods between the initials in the initials components, and may be updated accordingly. In some embodiments, once the punctuation is verified and corrected, the system and method may insert the updated character sequence into the source document in place of the originally identified character sequence, such that an author name text string originally in non-standardized format is replaced with an author name text string in standardized format.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Providing publications in electronic format is now a requirement in most fields of literature. The electronic format may allow for performing automated functions to the published document, such as automatically identifying, verifying, and correcting text strings contained in the document, or any other function of automatically processing text strings. These automated functions may be particularly useful in the field of scholarly literature, especially for providing accurately formatted bibliographic references that may be used as electronic links to related online content, such as referencing on-line databases (e.g., PubMed and CrossRef). These automated functions may be similarly useful for various other literatures in electronic format, such as business publication, technical reports, standards, political publications, fictional novels, blogs, meeting rosters, or any other literature containing text strings to be processed.

Often these automated functions must parse the text string into their component pieces as part of the identifying, verifying, and correcting processes. For example, in the case of formatting bibliographic references, the automated functions may parse the bibliographic references into component pieces including author surname, author initials, article title, journal name, year of publications, volume, page, or any other such components. There are various challenges in parsing text string into their component pieces. For example, these automated functions may need to perform the parsing on text strings in a wide range of editorial styles without pre-configured information regarding the pattern or format of the style. Further, these automated functions may need to parse a text string in a particular editorial style, even though the text string is not in the standardized format for that style (e.g., due to errors in punctuation or capitalization), and then reassemble the text string in the standardized format for that style. This creates a particular challenge in regards to particular components of bibliographic references, such as author name text strings, that may include multiple author names containing varying terms, punctuation, capitalization, and spacing.

Author Name Groups

Figure 1A:
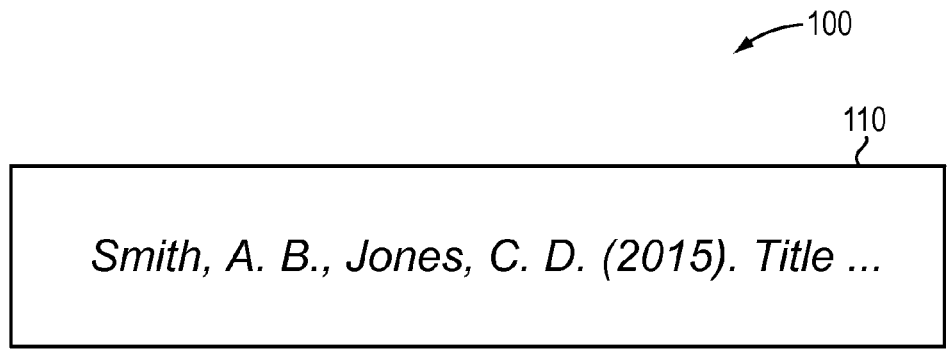
FIG. 1A is an example author name text string in standardized format in a document according to at least one example embodiment of the present invention.

A text string, such as bibliographic reference, may contain an author name text string, such as an author name group. An author name group may include one or more author names that each include the components of author surname and author initials. FIG. 1A shows an example bibliographic reference 110 that may be processed in embodiments of the present invention. The bibliographic reference 110 contains the author name group "Smith, A. B., Jones, C. D." presented in the standardized format of the APA-style. Note, that the APA-style, as in many editorial styles, uses commas to separate author names in an author name group, and a period is used at the end of the author name group, before the next component of the bibliographic reference (e.g., "(2015)."). The author name group contains two author names, "Smith, A. B." and "Jones C. D." The first author name "Smith, A. B." is formatted as an author surname ("Smith") followed by author initials ("A. B."), and the second author name "Jones, C. D." is also formatted as an author surname ("Jones") followed by author initials ("C. D."). In other author name groups, author names may only contain one initial (e.g., "A." instead of "A. B.") or contain "et al." to indicate additional authors. Further, in the format of some styles, the author names may instead be formatted as initials followed by surname. Embodiments of the present invention may process author name groups containing these formats, or containing various other standardized formats, including non-standardized formats as described below.

Figure 1B:
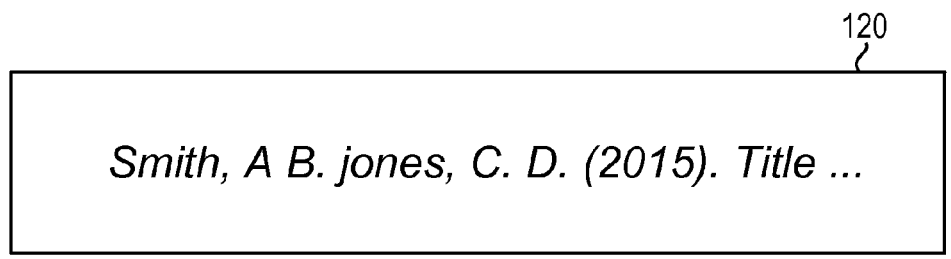
FIG. 1B is an example author name text string in non-standardized format in a document according to at least one example embodiment of the present invention.

FIG. 1B shows another example bibliographic reference 120 that may also be processed in some embodiments of the present invention. The bibliographic reference 120 contains the same author names as in FIG. 1A. However, the author name group in FIG. 1B is not in the standardized format of the APA-style because it has errors in both punctuation and capitalization. For example, the initials of the first author name ("A B.") is missing a period after the "A" and missing a comma at the end of the set, pair, or string of initials. In addition, the surname of the second author name ("jones") is incorrectly not capitalized. These errors make parsing the bibliographic references into component pieces by automated means more complex, and as such, make the author name group components especially difficult to parse accurately. For example, the missing comma at the end of the set of initials "A B." makes parsing the author name group particularly difficult in determining where the first author name ends and the second author name begins.

Scanning and Identifying Author Name Groups

Figure 2:
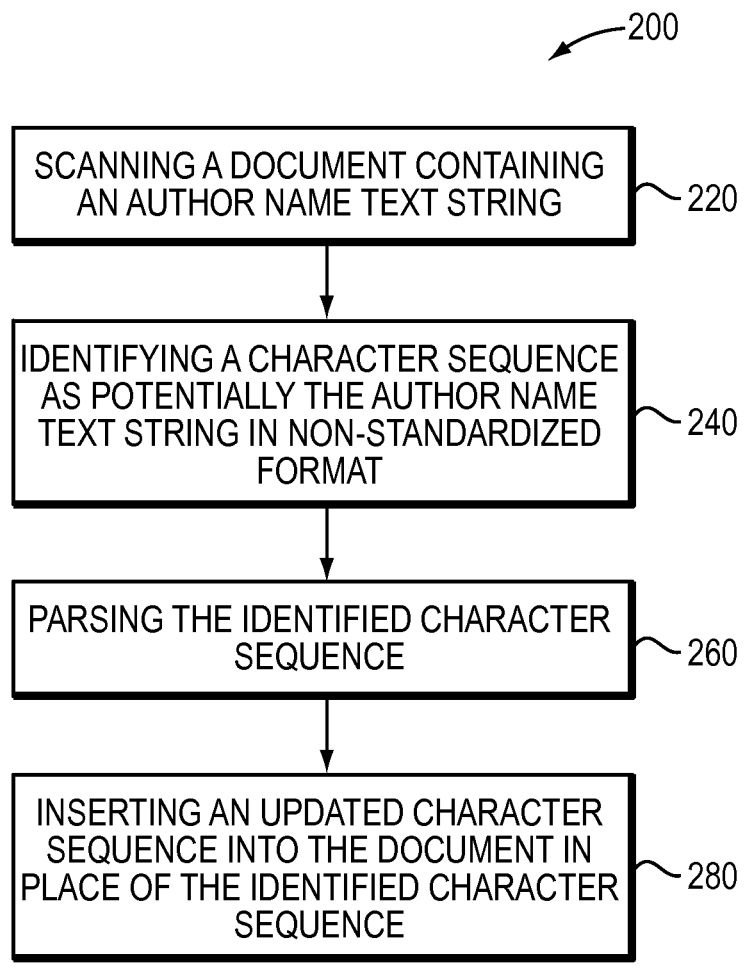
FIG. 2 is a flowchart depicting a method of parsing author names in a document according to at least one example embodiment of the present invention.

FIG. 2 is a flowchart 200 depicting a method of automatically parsing author names in a document according to at least one example embodiment of the present invention. The method begins by automatically scanning 220 a document containing an author name text string, such as an author name group. The scanning 220 may be performed by a scanner, or other such scanning module configured on a digital processor to scan a document according to the embodiments of the present invention. In some embodiments, the author name group may include a set of initials, one or more surnames, and punctuation comprising each author name contained in the group, as shown in FIGS. 1A and 1B. In some embodiments, the author name group may include other syntax for each author name, such as: a full first and middle name, full first name and middle initial, legal pedigree (e.g., Jr., Sr. or, II), surnames with dashes or apostrophes (e.g., Saint-Jerman), surname prefixes (e.g., "van" or "der"), conjunctors (e.g., "a la" or "y", such as in the surname "Sanchis y Sivera"), or the "et al." term for indicating additional authors. The author name group may be in the standardized format or may contain errors in punctuation or capitalization such that it does not meet the standardized format, as shown in FIG. 1B. FIG. 2 depicts a method being performed on a document that includes at least one author name group not in standardized format.

The scanned document (at 220) may be a publication of scholarly literature containing bibliographic references that include author name groups. In some embodiments, the scanned document may be a publication of other literature containing author name text string similar to author name groups. In other embodiments, the document scanned is not a publication, but any other document, such as a meeting roster, legal document or online blog, that contains author name text strings similar to author name groups. In yet other embodiments, the document may not contain author name text strings, but contain other text strings of interest with a similar standardized, regular format typically delimited by punctuation.

As part of scanning the document in FIG. 2, the method/step 240 may identify a character sequence in the document as potentially being an author name group in non-standardized format. The method/step 240 may identify the character sequence as an author name group using heuristic algorithms involving pattern recognition. The method may be implemented using any programming language or application suitable for implementing pattern recognition, including languages that allow processing of regular expressions, such as the OmniMark language or PERL.

The method/step 240 may identify the character sequence as meeting the characteristics of an author name group based on "surname followed by initials" or "initials followed by surname" sequences contained in the character sequence. These surname/initial sequences may be identified based on recognizing title case words, including dashes, apostrophes, and capitalization, that may comprise a surname. These surname/initials sequences may also be identified based on recognizing other possible components that may comprise a surname, such as legal pedigree (e.g., Jr., Sr., or II), surname prefixes (e.g., "van" or "der"), and conjunctors (e.g., "a la" or "y"). In some embodiments, the method may reference the possible surname components from memory, such as from a database or text file, for identification in the character sequence. These surname/initial sequences may be further identified based on recognizing sequences of one or more capital letters, each capital letter possibly separated by a period, that may comprise a set of initials.

In addition, the method 200 or step 240 may recognize other characteristics of the character sequence that may identify the character sequence as potentially an author name group. The method/step 240 may identify punctuation in the character sequence, such as commas or the word "and" (or any other variant of the word "and" such as "&") between a possible surname/initials sequence, or a period after one or more possible surname/initials sequences. The method/step 240 may also identify the character sequence as an author name group by the sequence ending with a recognizable indicator, such as "et al.", a year (possibly in parenthesis), or a title-case word followed by at least three lowercase words indicating the title of the referenced work (e.g., article title, book title, or conference paper). The method/step 240 may further check that an identified character sequence is not actually an organization name, Internet site, or other proper name that could be mistaken for a surname, by looking up the identified character sequence in such locations as a database of organization words and names. The method/step 240 may also check that the identified character sequence does not exceed a character limit indicative of being too long to be an author name group. In some embodiments, the scanned document may be in a style that marks text strings with tags, bullets, reference numbers, reference start commands, or other such markings that may be used to identify a character sequence as potentially an author name group.

In some embodiments, the method/step 240 may use the pattern logic shown as follows for identifying a character sequence in the document as potentially being an author name group in non-standardized format.

author-group=(author-group-piece+
      lookahead
      (et-al or
        reference-year or
        title-start )
)
where
author-group-piece=(surname-candidate or
   initials-candidate or
   dash or
   author-part-separator or
   author-conjunctor
)
et-al matches "et al." and its variants (such as different capitalization, face markup, etc.)
reference-year matches a year (4-digit number between 1454 and the present year) with or without surrounding parentheses
dash matches a hyphen character and its variants (such as n-dash)
author-part-separator=[white-space or 'r' or '.' or ';' or ':' . . . ]
author-conjunctor=('&' or 'and' or 'et' or 'und' or . . . )
surname-candidate=(surname-prefix* surname-main-part)
surname-prefix=(surname-prefix-word surname-prefix-sep?)
surname-prefix-word=('van' or 'Van' or 'von' or 'Von' or 'de' or 'De' . . . )
surname-prefix-sep=[white-space or apostrophe or '-']
surname-main-part=(uppercase-letter lowercase-letter+ ('-' uppercase-letter lowercase-letter+)*
)
initial-candidate=(uppercase-letter or 'Ch' or 'Th' . . . )
title-start=((title-case-word (white-space+ word){3})
   |('in' white-space title-case-word)
   |('In:' white-space title-case-word)
   |(" " title-case-word)
   . . .
)

After identifying a character sequence as possibly an author name group, step 260 shown in FIG. 2 automatically parses the identified character sequence. The parsing may be performed by a parser, or other such parsing module (generally referenced 260) configured on a digital processor to parse a character sequence according to the embodiments of the present invention. The parsing 260 may be performed to verify that the identified character sequence is actually an author name group. In some embodiments, if the author name group is in non-standardized format, such as containing errors in punctuation or capitalization, the method 200 or parser 260 may also update the character sequence to correct the errors. In some of these embodiments, including the embodiment shown in FIG. 2, inserter module 280 inserts the updated character sequence into the document in place of the identified character sequence, such that the author name group is then displayed in the document in standardized format. In some embodiments, the results of verifying or correcting the character sequence may also be output to the user by other means, such as in a separate window or as a hyperlink.

Saving Author Name Groups

Figure 3:
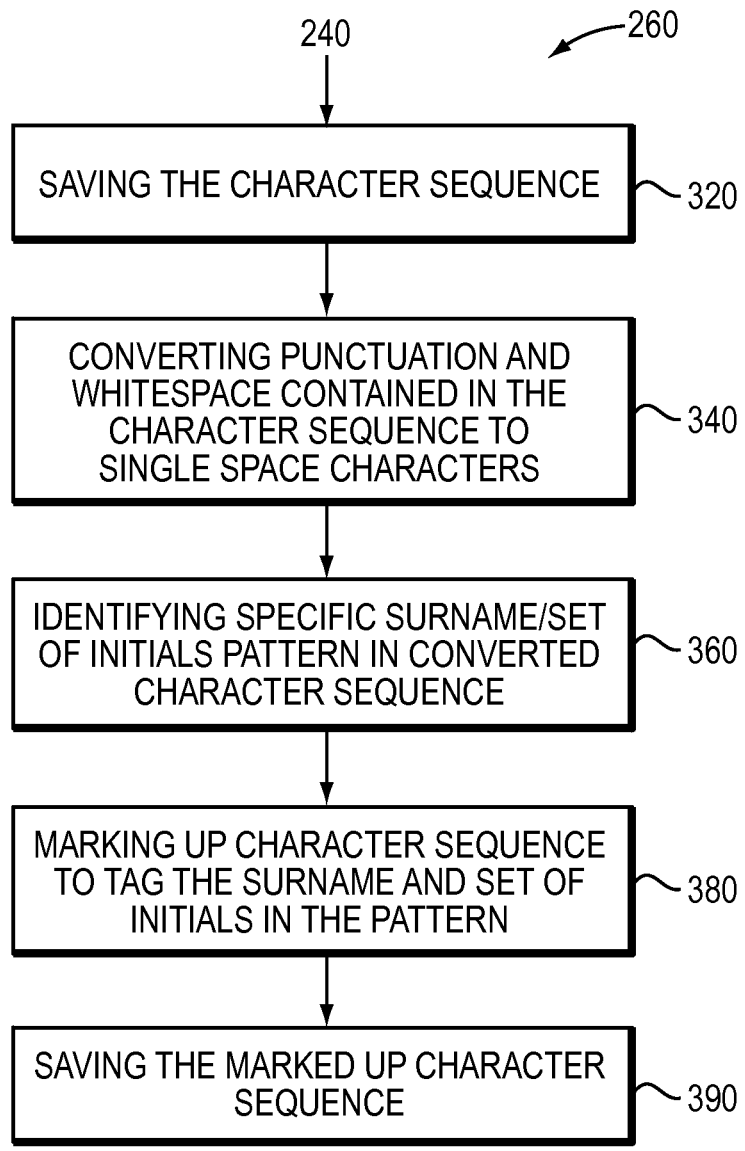
FIG. 3 is a flowchart depicting a method of updating author names used in at least one embodiment of the method of parsing author names shown in FIG. 2.

FIG. 3 is a flowchart depicting further details of parser 260 of FIG. 2 automatically parsing author names from the identified character sequence of 240. That is, the output of step 240 of FIG. 2, a character sequence identified as potentially being the author name group, serves as the input to the parser method 260 of FIG. 3. The parser method 260 begins by saving 320 the identified character sequence for recreating the author name group after the completion of the parsing. The identified character sequence is saved in a data structure that preserves information about the format of the character sequence, such as preserving the number and order of alphanumeric characters in the character sequence. In some embodiments, the parser 260 at step 320 splits the identified character sequence into multiple pieces, using the alphanumeric characters of the character sequence as anchors. That is, the first piece contains all the non-alphanumeric characters from the beginning of the character sequence up to the first alphanumeric character in the sequence (it may be an empty set). The second piece contains that alphanumeric character and all the following non-alphanumeric characters (if any), up to the following alphanumeric character. Additional pieces are formed in the same manner as the second piece until reaching the end of the character sequence.

All of the pieces of the split character sequence are saved in a structure in memory for use when restoring the author name group at the completion of the parsing. In some embodiments, parser step 320 saves the pieces combined into an array, such as shown in the following examples. Example 1 shows how the non-standardized author name group "Smith, A B. jones C. D." from FIG. 1B may be saved in memory as an array in some embodiments of the invention. Further, Example 2 shows how another author name group "<b>Smith</b> A B.", containing face markup element "<b>", may be saved in memory as an array in some embodiments of the invention.

Example 1

"Smith, A B. jones,&tab;C. D."=> [" ", "S", "m", "i", "t", "h,", "A", "B.", "j", "o", "n", "e", "s,&tab;", "C.", "D."]

Example 2

"&tab;<b>Smith</b> A B."=> ["&tab;<b>", "S", "m", "i", "t", "h</b>", "A", "B."]

Marking Up Author Name Groups

Once the parser method 260 (step 320) saves a copy of the identified character sequence as an array in memory, a parser step 340 updates the identified character sequence. Step 340 may first convert any punctuation, face-markup, white space, or other such characters between words in the identified character sequence to a single space character, such as a single space (ASCII ×20 character). For example, "A B." and "C. D." from FIG. 1B may be converted to "A B" and "C D". Next, step 360 may use a similar identifying method as described above in the "Scanning and Identifying Author Name Groups" section to identify the specific "surname followed by initials" or "initials followed by surname" pattern comprising each author name contained in the character sequence. Then, this identifying method may be further used at 360 to identify the individual surname and set of initials components contained in each identified surname/initials pattern.

In some embodiments, step 360 may use the pattern logic shown as follows for identifying a "surname followed by initials" pattern comprising an individual author name in the character sequence.

surname-inits=(surname white-space+ initials)
where
surname=(surname-prefix* surname-main-part)
surname-prefix=(surname-prefix-word surname-prefix-sep?)
surname-prefix-word ('van' or 'Van' or 'von' or 'Von' or 'de' or 'De' . . . )
surname-prefix-sep=[white-space or apostrophe or '-']

surname-main-part=(uppercase-letter lowercase-letter+
  ('-' uppercase-letter lowercase-letter+)*
)
initials=(initial
  (white-space
    initial
  )*
)
initial=(uppercase-letter or 'Ch' or 'Th' . . . )

In some embodiments, step 360 may use the pattern logic shown as follows for identifying an "initials followed by surname" pattern comprising an individual author name in the character sequence.

surname-inits=(initials white-space+ surname)
where
surname=(surname-prefix* surname-main-part)
surname-prefix=(surname-prefix-word surname-prefix-sep?)
surname-prefix-word ('van' or 'Van' or 'von' or 'Von' or 'de' or 'De' . . . )
surname-prefix-sep=[white-space or apostrophe or '-']
surname-main-part=(uppercase-letter lowercase-letter+
  ('-' uppercase-letter lowercase-letter+)*
)
initials=(initial
  (white-space
    initial
  )*
)
initial=(uppercase-letter or 'Ch' or 'Th' . . . )

If the converted sequence cannot be identified as a sequence of one or more author names, such that the converted sequence cannot be parsed into surname/initials patterns and each sequence further parsed into individual surname and set of initials components, then the parsing method 260 may be aborted. As such, the parser 260 may end the parsing process of the character sequence, and based on not identifying these patterns, the parser 260 may determine that the character sequence is not an author name group. The method and system (260, 200) may perform further actions, including restoring the identified character sequence back to its original format, cleaning up saved memory structures, and continue to scan the document for other character sequences that may possibly be an author name group.

If parser step 360 identifies components, i.e., individual surname and set of initials in the surname/initials pattern, then marker step 380 marks the character sequence to indicate the surname and the set of initials. In some embodiments, the components are marked up using a markup language, such as the XML reference markup language, or other such markup language, resulting in distinct markup elements, such as XML reference markup tags, being applied to the individual components. In some embodiments, the parser method 260 may make modifications to the surname and set of initials components, but some of these embodiments require that any such modifications preserve the number and order of alphanumeric characters in the sequence. For example, in some embodiments, once the converted surname and initials components are marked up, the parser method 260/step 380 may correct any non-standardized capitalization in the surname and set of initials, such as changing "jones", as shown in FIG. 1B, to "Jones".

In example embodiments, the markup elements may be applied to the surname and set of initials components as shown in Example 3. In Example 3, the markup elements <REFauthors><REFauthor><REFlastname> are used to markup the converted surnames "Smith" and "Jones", and the markup elements <REFauthors><REFauthor><REFinits> are used to markup the converted sets of initials "A B" and "C D".

Example 3

"<REFauthors><REFauthor><REFlastname>Smith</REFlastname> <REFinits>A B </REFinits></REFauthor><REFauthor><REFlastname>Jones</REFlastname><REFinits>C D </REFinits></REFauthor></REFauthors>".

The parser at step 390 may then save the marked up character sequence in a similar manner as the original identified character sequence at step 320. Similar to the method used for saving the original identified character sequence, the alphanumeric characters of the marked up character sequence may be used as anchors to split the marked up sequence into multiple pieces. That is, the first piece starts with the first character of the marked up character sequence, regardless of whether the first character is an alphanumeric character. The first piece contains all the non-alphanumeric characters from the beginning of the character sequence up to the first alphanumeric character in the sequence (it may be an empty set). The second piece contains that alphanumeric character and all the following non-alphanumeric characters (if any), up to the following alphanumeric character. Additional pieces are formed in the same manner as the second piece until reaching the end of the character sequence. Step 390 saves all of the pieces of the marked up character sequence in a structure in memory for use when restoring the author name group at the completion of the parsing. In some embodiments, parser step 390 saves the pieces in an array, such as shown in Example 4 for the author name group of FIG. 1B. Note that in Example 4, the author name group of FIG. 1B being saved has already been converted in step 340 and modified to correct non-standardized capitalization (e.g., "jones" modified to "Jones") in step 380 as described above.

Example 4

["<REFauthors><REFauthor><REFlastname>", "S", "m", "i", "t", "h </REFlastname> <REFinits>", "A", "B</REFinits></REFauthor><REFauthor><REFlastname>", "Jones </REFlastname> <REFinits>", "C", "D </REFinits></REFauthor></REFauthors>"]

Restoring Author Name Groups

Figure 4:
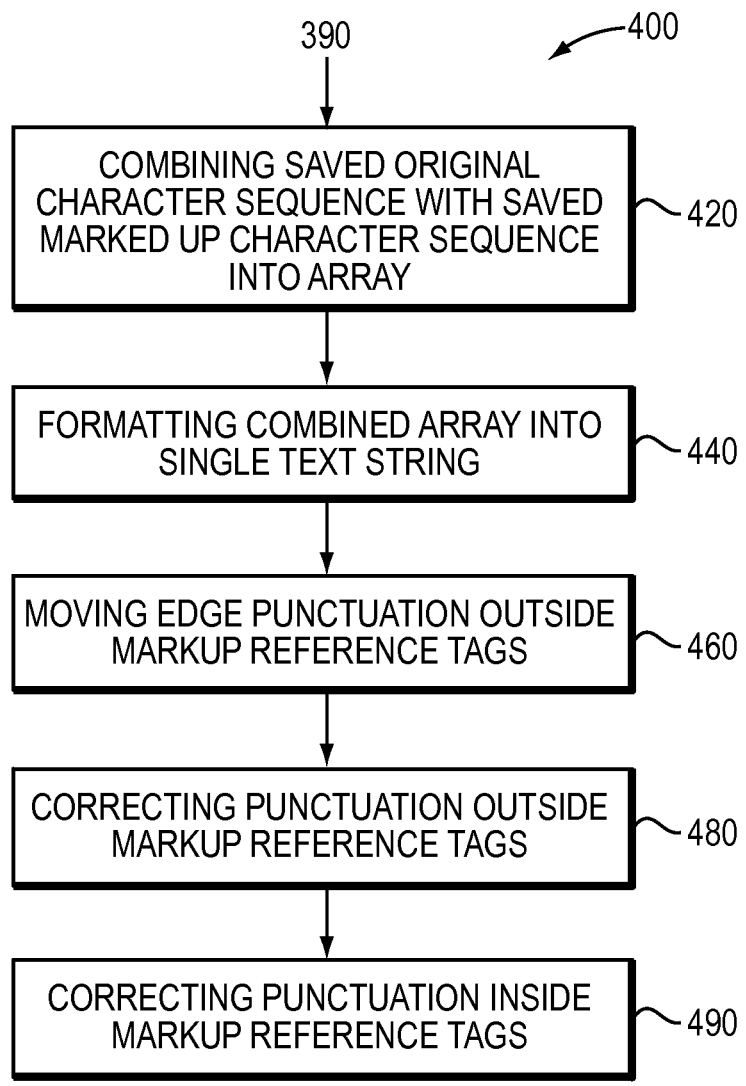
FIG. 4 is a flowchart depicting a method of restoring author names, including correcting punctuation and capitalization, used in at least one embodiment of the method of parsing author names shown in FIG. 2.

FIG. 4 is a flowchart depicting a method 400 of automatically restoring an author name group, which may be used as part of the parsing of the identified character sequence in parser method 260 of FIG. 2. This method occurs after step 390 of FIG. 3, and as such, the original identified character sequence and the marked up character sequence have already been saved in a respective first array (array 1) and second array (array 2). The first array and the second array may have a one-to-one correspondence, as illustrated by comparing example array 1 in Example 1 with example array 2 in Example 4. The first piece of example array 1 (" ") corresponds to the first piece of example array 2 ("<REFauthors><REFauthor><REFlastname>"), the second piece of example array 1 ("S") corresponds to the second piece of example array 2 ("S"), and each additional piece of example array 1 similarly corresponds to the respective piece of example array 2. The method step 420 then combines each piece of example array 1 with the corresponding piece of example array 2 to create a third combined array. The combining of the pieces involves preserving the markup elements and any modification made to the marked up character sequence in array 2, such as updated capitalization, and preserving the original punctuation saved in array 1 to create the third array. For example, if the piece "B." of example array 1 is combined with the corresponding piece "B </REFinits></REFauthor><REFauthor><REFlastname>" of example array 2, the resulting third array piece would be "B.</REFinits></REFauthor><REFauthor><REFlastname>".

Once the combining 420 of the original character sequence array with the marked up sequence array is completed for each piece, the method step 440 may format the pieces of the combined array into a single text string. At this point, the markup elements surround the appropriate surname and set of initials for each author name, and include any modification made to the converted character sequence, but any original errors in punctuation, white space, and face markup are still present within each set of markup elements. Example 5 as follows shows the text string of the combined array with errors in punctuation still present.

Example 5

"<REFauthors><REFauthor><REFlastname>Smith, </REFlastname><REFinits>A        B.</REFinits></REFauthor><REFauthor><REFlastname>Jones,&tab;</REFlastname><REFinits>C.       D.</REFinits></REFauthor></REFauthors>"

The method 400 at step 460 then addresses the errors in punctuation, white space, and face markup. Step 460 may first move any punctuation located on the edge of the text surrounded by markup elements outside the markup elements. The method step 460 may then alter the placement of particular punctuation, such as periods, outside the markup elements back into the markup elements. This moving may be to segregate punctuation that is part of an author name component, such as a period that is part of the set of initials, from punctuation separating the components of the author name, such as a period that separates the author name from the title. For example, if a period is moved outside the <REFinits> markup elements that mark an initial of an author name, then the periods are moved back inside the markup elements. The exception to this moving of the period occurs if the initials are located at the very end of the author name group. In this case, the period is moved inside the markup elements if there is more than one initial surrounded by the <REFinits> markup elements, and one of the initials (besides the last initial) is followed by a period, or if any of the previous authors (besides the last author) has a period after its initials. Example 6 as follows shows punctuation after the altering of punctuation placement.

Example 6

"<REFauthors><REFauthor><REFlastname>Smith</REFlastname>, <REFinits>A    B.</REFinits></REFauthor>, <REFauthor><REFlastname>Jones</REFlastname>,&tab; <REFinits>C.           D.</REFinits></REFauthor></REFauthors>"

Once the method at 460 has altered the punctuation accordingly, in some embodiments, the method steps 480 and 490 may update the punctuation to standardized format base on the editorial style of the documents. In some example embodiments, step 490 may update the text inside the markup elements with the correct placement of punctuation based on the editorial style of the document. For example, the text contained inside the <REFinits> markup elements may be updated to add missing periods separating each initial, or to remove any misplaced commas. In some embodiments, step 480 may update the punctuation outside the markup elements with the correct placement of punctuation separating the components based on the editorial style. For example, if a comma is missing between the <REFlastname> markup elements and the <REFinits> markup elements (i.e., between surname and initials), then the method may add the missing comma accordingly. For further example, if a period is placed between the <REFlastname> markup elements and the <REFinits> markup elements, instead of the correct comma, then the method may update the period to a comma accordingly. Example 7 as follows shows the text string of Example 6 with updated punctuation inside and outside the markup elements according to the standardized format of the APA-style.

Example 7

"<REFauthors><REFauthor><REFlastname>Smith</REFlastname>, <REFinits>A. B.</REFinits></REFauthor>, <REFauthor><REFlastname>Jones</REFlastname>,&tab; <REFinits>C.           D.</REFinits></REFauthor></REFauthors>"

After the method 400 has completed updating of the marked up text string, the method 200/step 280 may then insert the text string into the document in place of the original identified character sequence. In some embodiments, the method 200/step 280 may first remove the markup elements surrounding the components of the author name group prior to inserting into the document. In other embodiments, the text strings may be inserted into the document with the markup elements still present. In some embodiments, the text string or components of the text string may be returned to a user in other forms, such as a hypertext link or in a separate editing window.

Digital Processing Environment

Figure 5:
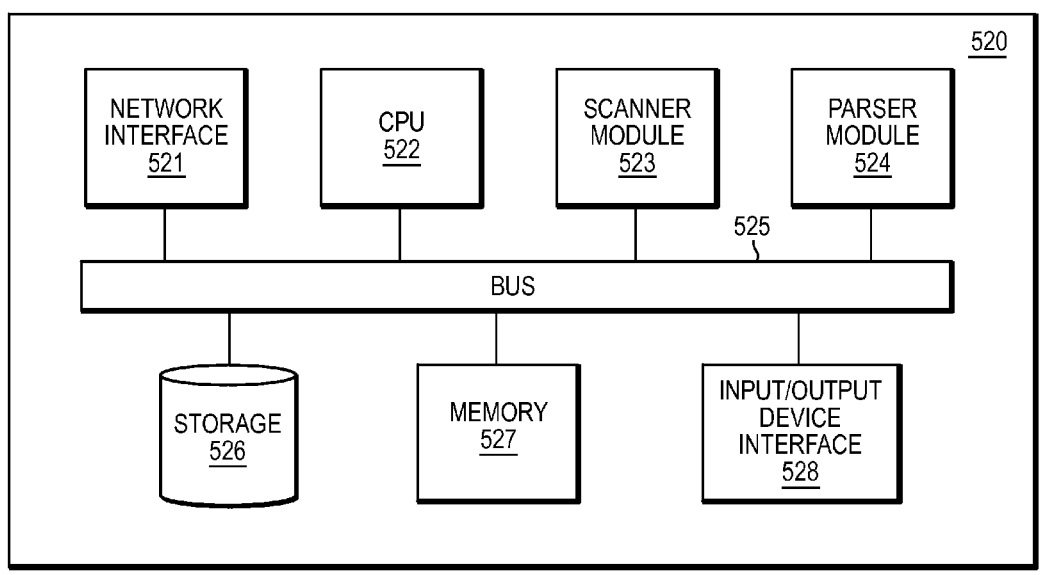
FIG. 5 is a block diagram of a computer (or digital processing) system for parsing author names in a document according to at least one embodiment of the present invention.

FIG. 5 is a simplified block diagram of a computer-based system 520 that may be used to parse author names in a document according to an embodiment of the present invention. The system 520 comprises a bus 525. The bus 525 serves as an interconnector between the various components of the system 520. Connected to the bus 525 is an input/output device interface 528 for connecting various input and output devices such as a keyboard, mouse, display, speakers, etc. to the system 520. A central processing unit (CPU) 522 is connected to the bus 525 and provides for the execution of computer instructions. Memory 527 provides volatile storage for data used for carrying out computer instructions. Storage 526 provides non-volatile storage for software instructions, such as an operating system (not shown). In particular, memory 527 and/or storage 526 are configured with program instructions implementing methods 200, 260, and 400 for parsing and automatically restoring author name groups detailed above in FIGS. 2-4. The system 520 also comprises a network interface 521 for connecting to any variety of networks known in the art, including cloud, wide area networks (WANs) and local area networks (LANs).

Further connected to the bus 525 is a scanner module 523. The scanner module 523 is configured to scan a document containing an author name group and identifying a character sequence in the document as potentially being the author name group. The scanner module 523 may provide scanning and identification functions through any means known in the art. For example, the scanner module 523 may reference pattern data that is stored on the storage device 526 or memory 527. For further example, the scanner module 523 may scan the document from any point communicatively coupled to the system 520 via the network interface 521 and/or input/output device interface 528.

The system 520 further comprises a parser module 524 that is communicatively/operatively coupled to the scanner module 523. The parser module 524 is configured to parse the identified character sequence and determine whether the character sequence is actually the author name group. The parser module 524 may provide parsing functions through any means known in the art. For example, the parser module 524 may store the identified character sequence in a data structure, such as an array, on the storage device 526 or memory 527. For another example, the parser module 524 may mark up the character sequence using markup elements by means of the CPU via the bus. For further example, the parser module 524 may parse the identified character sequence from any point communicatively coupled to the system 520 via the network interface 521 and/or input/output device interface 528.

It should be understood that the example embodiments described herein may be implemented in many different way. In some instances, the various methods and machines described herein may each be implemented by a physical, virtual, or hybrid general purpose computer, such as the computer system 520. The computer system 520 may be transformed into the machines that execute the methods described herein, for example, by loading software instructions into either memory 527 or non-volatile storage 526 for execution by the CPU 522. Further, while the scanner module 523 and parser module 524 are shown as separate modules, in an example embodiment these modules may be implemented using a variety of configurations.

The system 520 and its various components may be configured to carry out any embodiments of the present invention described herein. For example, the system 520 may be configured to carry out the methods 200, 260, and 400 described hereinabove in relation to FIGS. 2-4. In an example embodiment, the scanner module 523 and parser module 524 may be implemented in software that is stored on the memory 527 and/or storage device 526. In such an example embodiment, the CPU 522 and the memory 527 with computer code instructions stored on the memory 527 and/or storage device 526 implement a scanner module that identifier a character sequence as possibly an author name group. Further, the components of the system 520 implement a parse module that is operatively coupled to the scanner module and configured to determine whether the character sequence is actually an author name group.

Figure 6:
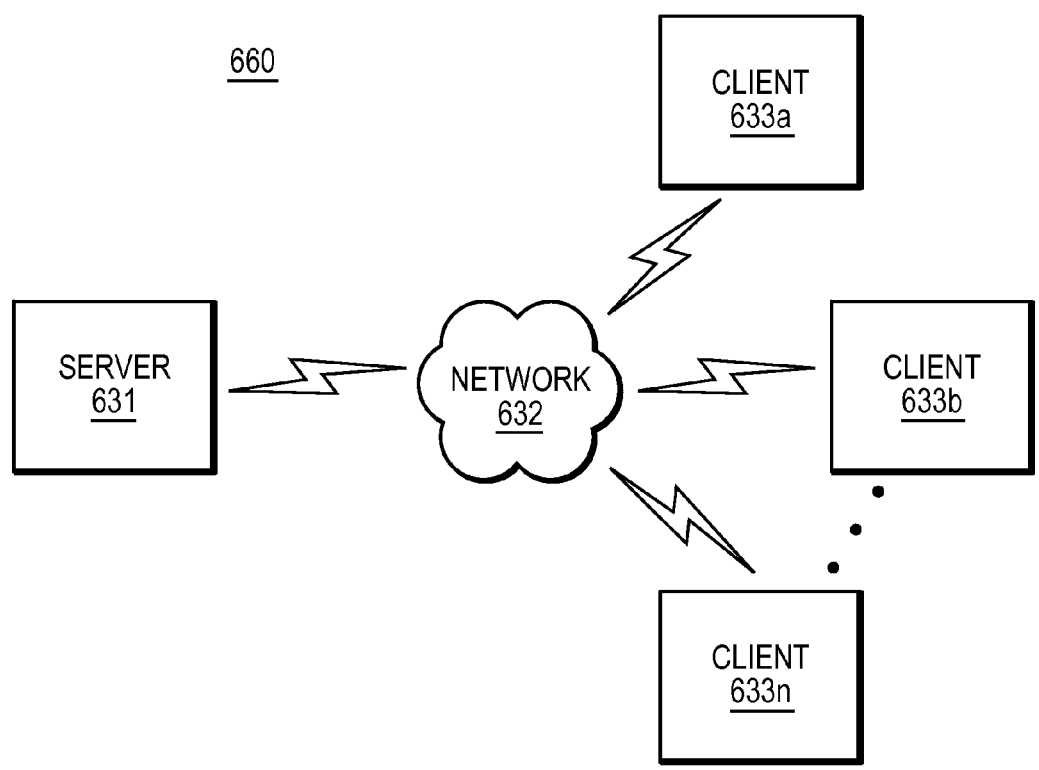
FIG. 6 is a schematic diagram of an example computer network environment in which embodiments of the invention may be implemented.

FIG. 6 illustrates a computer network environment 660 in which an embodiment of the present invention may be implemented. In the computer network environment 660, the server 631 is linked through the communications network 632 to the clients 633a-n. The environment 600 may be used to allow the clients 633a-n, alone or in combination with server 631, to execute any of the methods described hereinabove. It should be understood that the example embodiments described above may be implemented in many different ways. In some instances, the various methods and machines described herein may each be implemented by a physical, virtual, or hybrid general purpose computer, or a computer network environment such as the computer environment 660.

Embodiments or aspects thereof may be implemented in the form of hardware, firmware, or software. If implemented in software, the software may be stored on any non-transient computer readable medium that is configured to enable a processor to load the software or subsets of instructions thereof. The processor then executes the instructions and is configured to operate or cause an apparatus to operate in a manner as described herein.

Further, firmware, software, routines, or instructions may be described herein as performing certain actions and/or functions of the data processors. However, it should be appreciated that such descriptions contained herein are merely for convenience and that such actions in fact result from computing devices, processors, controllers, or other devices executing the firmware, software, routines, instructions, etc.

It should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and, thus, the data processors described herein are intended for purposes of illustration only and not as a limitation of the embodiments.

While this invention has been particularly shown and described with references to example embodiments thereof, it will be understood by those skilled in the art that various changes in form and details may be made therein without departing from the scope of the invention encompassed by the appended claims.

What is claimed is:

1. A computer-implemented method for parsing author names in a document, the method comprising:
    electronically scanning a document that contains an author name text string, the author name text string comprising a set of initials, one or more surnames, and punctuation, and the author name text string comprising at least one author name in non-standardized format;
    identifying a character sequence in the document as potentially being the author name text string, wherein the identifying is based on: (i) a sequence of title-case words, capital letters, and punctuation in the character sequence, and (ii) the character sequence ending with a recognized indicator; and
    parsing the identified character sequence and determining whether the identified character sequence is the author name text string, wherein the parsing and determining comprises:
        updating the identified character sequence by converting any punctuation or whitespace between terms in the character sequence to single space character, and
        determining whether one or more author names are contained in the updated character sequence by identifying a pattern of surname and set of initials in the updated character sequence, such that an author name in non-standardized format in the document is identified and output in standardized format.

2. The computer-implemented method of claim 1, wherein the author name text string is an author group having one or more author names, each author name comprising a respective set of initials, a respective surname, and punctuation.

3. The computer-implemented method of claim 1 wherein the method parses more than one author name text strings.

4. The computer-implemented method of claim 1, wherein parsing and determining further comprises:
saving a copy of the identified character sequence as an original character sequence prior to updating the character sequence;
marking up components of the one or more author names determined to be contained in the updated character sequence, said marking up indicating components as a surname or initials of a respective author name;
restoring the identified character sequence, wherein the restoring comprises combining the original character sequenced with the marked up components; and
inserting the restored character sequence into the document in place of the identified character sequence.

5. The computer-implemented method of claim 1, wherein the author name text string is part of a bibliographic reference, and the document is a piece of scholarly literature.

6. The computer-implemented method of claim 1, wherein the at least one author name in non-standardized format is ill-punctuated.

7. The computer-implemented method of claim 1, wherein the identified character sequence follows one or more patterns of: (i) surname followed by one or more initials, (ii) one or more initials followed by surname, (iii) sequence of capital letters possibly separated by punctuation, and (iv) punctuation or the term "and".

8. The computer-implemented method of claim 1, wherein the recognized indicator includes at least one of: (i) "et al", (ii) a digit indication of a year, or (iii) a title-case word followed by at least three lowercase terms.

9. The computer-implemented method of claim 4, wherein the method is performed using a markup language, and the marking up of components results in markup elements.

10. The computer-implemented method of claim 9, wherein saving a copy of the identified character sequence further comprises:
splitting the original character sequence into pieces based on alphanumeric characters; and
combining the pieces into an array.

11. The computer-implemented method of claim 10, wherein restoring the identified character sequence further comprises:
saving the updated character sequence by:
splitting the updated character sequence into pieces based on alphanumeric characters, and
combining the pieces of the updated character sequence into a second array, combining the array of the saved original character sequence with markup elements of the saved updated character sequence, resulting in a combined array;
formatting the combined array into a markup format as a single string; and
updating punctuation placement within the markup format.

12. A computer system for parsing author names in a document, the system comprising:
a scanner with a digital processor, the scanner configured to:
electronically scan a document that contains an author name text string, the author name text string comprising a set of initials, one or more surnames, and punctuation, and the author name text string comprising at least one author name in non-standardized format;
identify a character sequence in the document as potentially being the author name text string, wherein the identifying is based on: (i) a sequence of title-case words, capital letters, and punctuation in the character sequence, and (ii) the character sequence ending with a recognized indicator; and
a parser with a digital processor, the parser configured to:
parse the identified character sequence and determining whether the identified character sequence is the author name text string, wherein the parsing and determining comprises:
updating the identified character sequence by converting any punctuation or whitespace between terms in the character sequence to single space character, and
determining whether one or more author names are contained in the updated character sequence by identifying a pattern of surname and set of initials in the updated character sequence, such that an author name in non-standardized format in the document is identified and output in standardized format.

13. The computer system of claim 12, wherein the author name text string is an author group having one or more author names, each author name comprising a respective set of initials, a respective surname, and punctuation.

14. The computer system of claim 12, wherein the system parses more than one author name text strings.

15. The computer system of claim 12, wherein the parse is further configured to:
save a copy of the identified character sequence as an original character sequence prior to updating the character sequence;
mark up components of the one or more author names determined to be contained in the updated character sequence, said marking up indicating components as a surname or initials of a respective author name;
restore the identified character sequence, wherein the restoring comprises combining the original character sequenced with the marked up components; and
insert the restored character sequence into the document in place of the identified character sequence.

16. The computer system of claim 12, wherein the author name text string is part of a bibliographic reference, and the document is a piece of scholarly literature.

17. The computer system of claim 12, wherein the at least one author name in non-standardized format is ill-punctuated.

18. The computer system of claim 12, wherein the identified character sequence follows one or more patterns of: (i) surname followed by one or more initials, (ii) one or more initials followed by surname, (iii) sequence of capital letters possibly separated by punctuation, and (iv) punctuation or the term "and".

19. The computer system of claim 12, wherein the recognized indicator includes at least one of: (i) "et al", (ii) a digit indication of a year, or (iii) a title-case word followed by at least three lowercase terms.

20. The computer system of claim 15, wherein the system uses a markup language, and the marking up of components results in markup elements.

21. The computer system of claim 20, wherein to save a copy of the identified character sequence, the parser is further configured to:
split the original character sequence into pieces based on alphanumeric characters; and
combine the pieces into an array.

22. The computer system of claim 21, wherein to restore the identified character sequence, the parser is further configured to:
- save the updated character sequence by:
- split the updated character sequence into pieces based on alphanumeric characters, and
- combine the pieces of the updated character sequence into a second array,
- combining the array of the saved original character sequence with markup elements of the saved updated character sequence, resulting in a combined array;
- format the combined array into a markup format as a single string; and
- update punctuation placement within the markup format.

\* \* \* \* \*